(12) United States Patent
Sakaguchi et al.

(10) Patent No.: US 8,207,673 B2
(45) Date of Patent: *Jun. 26, 2012

(54) HIGH-PRESSURE DISCHARGE LAMP, LAMP UNIT USING THE SAME, AND PROJECTION-TYPE IMAGE DISPLAY DEVICE USING THE LAMP UNIT

(75) Inventors: Jun Sakaguchi, Osaka (JP); Yoshiki Kitahara, Osaka (JP); Katsuhiro Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 78 days.

This patent is subject to a terminal disclaimer.

(21) Appl. No.: 12/668,949

(22) PCT Filed: Jul. 14, 2008

(86) PCT No.: PCT/JP2008/001876
§ 371 (c)(1),
(2), (4) Date: Jan. 13, 2010

(87) PCT Pub. No.: WO2009/011117
PCT Pub. Date: Jan. 22, 2009

(65) Prior Publication Data
US 2010/0188855 A1     Jul. 29, 2010

(30) Foreign Application Priority Data

Jul. 17, 2007 (JP) ................................. 2007-186093
Feb. 29, 2008 (JP) ................................. 2008-050578

(51) Int. Cl.
*H01J 1/62* (2006.01)
(52) U.S. Cl. .................................. 313/623; 362/296.09
(58) Field of Classification Search .......... 313/623–625, 313/634–636, 493, 318.12, 570
See application file for complete search history.

(56) References Cited

U.S. PATENT DOCUMENTS

| | | | | |
|---|---|---|---|---|
| 4,550,269 A | * | 10/1985 | Dixon | ........................... 313/331 |
| 5,200,669 A | | 4/1993 | Dixon et al. | |
| 6,426,592 B2 | * | 7/2002 | Nishida et al. | ................ 313/623 |

(Continued)

FOREIGN PATENT DOCUMENTS

CN         1442878 A        9/2003

(Continued)

*Primary Examiner* — Peter Macchiarolo
(74) *Attorney, Agent, or Firm* — Hamre, Schumann, Mueller & Larson, P.C.

(57) ABSTRACT

A short arc high-pressure discharge lamp has an arc tube 1 made of quartz glass including a light-emitting portion 2 that fills mercury inside thereof and has a pair of electrodes arranged so as to face each other, and a sealing portion 3 connected to the light-emitting portion. The pair of electrodes have an electrode bar 5a, one end of the electrode bar is located in an internal space of the light-emitting portion, and the other end of the electrode bar is embedded in the sealing portion and bonded to a conductive metal-foil 7 sealed in the sealing portion. In at least a part of a portion of the electrode bar embedded in the sealing portion, the entire outer peripheral surface thereof is covered tightly with a metal-foil sleeve 7a. A high efficiency and high quality lamp is obtained in which fracture in the sealing portion of the arc tube caused by an ultrahigh vapor pressure in the tube surely is suppressed over the lifetime of the lamp, and the vapor pressure in the arc tube is elevated up to 30 MPa or more.

8 Claims, 16 Drawing Sheets

U.S. PATENT DOCUMENTS

| | | | |
|---|---|---|---|
| 6,600,266 B1 * | 7/2003 | Nakagawa | 313/623 |
| 6,624,576 B1 * | 9/2003 | Mittler | 313/623 |
| 7,514,871 B2 * | 4/2009 | Scholl et al. | 313/623 |
| 7,671,536 B2 * | 3/2010 | Takagaki et al. | 313/631 |
| 7,759,871 B2 * | 7/2010 | Chowdhury et al. | 313/623 |
| 2001/0005117 A1 | 6/2001 | Nishida et al. | |
| 2003/0052603 A1 | 3/2003 | Takahashi et al. | |
| 2003/0076040 A1 | 4/2003 | Kumada et al. | |
| 2003/0168981 A1 | 9/2003 | Kanzaki | |
| 2004/0183442 A1 | 9/2004 | Kanzaki | |
| 2010/0013369 A1 * | 1/2010 | Kitahara et al. | 313/113 |

FOREIGN PATENT DOCUMENTS

| | | |
|---|---|---|
| EP | 0 479 087 | 4/1992 |
| EP | 1 049 134 | 11/2000 |
| JP | 1-151149 A | 6/1989 |
| JP | 6-251749 A | 9/1994 |
| JP | 11-176385 A | 7/1999 |
| JP | 2001-189149 A | 7/2001 |
| JP | 2001-250504 A | 9/2001 |
| JP | 2003-123696 A | 4/2003 |
| JP | 2003-257373 A | 9/2003 |
| JP | 2004-006424 A | 1/2004 |
| JP | 3518533 | 2/2004 |
| JP | 3570414 | 7/2004 |
| JP | 2004-265753 A | 9/2004 |
| JP | 2004-296178 A | 10/2004 |
| JP | 2005-100874 | 4/2005 |
| JP | 2008-71718 | 3/2008 |

* cited by examiner

HIGH-PRESSURE DISCHARGE LAMP, LAMP UNIT USING THE SAME, AND PROJECTION-TYPE IMAGE DISPLAY DEVICE USING THE LAMP UNIT

TECHNICAL FIELD

The present invention relates to a high-pressure discharge lamp, and in particular, relates to a configuration of a sealing portion of an arc tube. The present invention further relates to a lamp unit using the high-pressure discharge lamp and a projection-type image display device using the lamp unit.

BACKGROUND ART

As a light source for projection-type image display devices such as a liquid crystal projector, a light source of nearly a point light source and having high brightness and high color rendering property, for example, a high-pressure mercury lamp, has been used widely.

FIG. 15 is a front cross-sectional view showing a configuration of an arc tube 101 in a typical short arc high-pressure mercury lamp. A vessel of an arc tube 101 is made of quartz glass. The arc tube 101 includes a spheroidal light-emitting portion 102 in the central portion thereof, and columnar sealing portions 103 and 104 that are connected respectively with both sides of the light-emitting portion 102 and extend outward. Inside the light-emitting portion 102, a pair of electrodes 105 and 106 made of tungsten (W) are disposed opposite to each other. At rear ends of electrode bars 105a and 106a (circular in cross section) constituting a part of the electrodes 105 and 106, molybdenum (Mo) metal-foils 107 and 108 in rectangular strip shapes are bonded respectively by welding.

In the sealing portions 103 and 104, parts of the rear end sides of the electrode bars 105a and 106a are embedded. Although the electrode bars 105a and 106a are embedded therein, this does not mean that, in the portions of the electrode bars 105a and 106a located in the sealing portions 103 and 104, the entire outer peripheral surfaces thereof are perfectly in close contact with the quartz glass. That is, when a certain region of the outer peripheral surface of the electrode bars 105a and 106a is seen, unavoidably, a part of the outer peripheral surface is not in close contact with the quartz glass, while the remaining part is in close contact with the quartz glass. Thus, a minute gap is formed that allows the ingress of, for example, gas filled in the light-emitting portion 102. Especially in a region A where the electrode bar 105a (106a) and the metal-foil 107 (108) overlap one another, a gap X slightly larger than the above-described gap is formed as shown in an enlarged partial view of FIG. 15.

To cope with this, in general, the metal-foils 107 and 108 thinned to a thickness of 20 μm are used in the sealing portions 103 and 104, whereby the occurrence of the above-described gap during the sealing process can be suppressed, and the airtightness in the sealing portions 103 and 104 are secured. Further, the use of the thinned metal-foils 107 and 108 can relieve the stress caused by the difference in thermal expansion coefficient between the metal-foils 107, 108 and the quartz glass that is a constituent material of the sealing portions 103, 104. Thus, the occurrence of microcracks in that region can be suppressed.

However, regarding the electrode bars 105a and 106a, unlike the metal-foils 107 and 108, the stress caused by the difference in thermal expansion coefficient from the quartz glass during the sealing process cannot be relieved, and this sometimes causes microcracks in that region. Although only microcracks occur in this situation, in a high-pressure discharge lamp aimed at improving brightness by increasing the amount of filled mercury (e.g. 0.15 mg/mm$^3$ or more) to increase a vapor pressure at the time of lighting, the following problem arises: starting from a few microcracks, microcracks gradually grow due to the stress applied by a high vapor pressure at the time of lighting, which has sometimes resulted in the fracture in the sealing portions 103 and 104 (for example, see Patent Document 1).

Especially in the regions where the gaps X are formed, i.e., the overlapped regions of the electrode bars 105a, 106a and the metal-foils 107, 108, cracks larger (e.g. twice or triple as large) than microcracks occurring in the other regions where the electrode bars 105a and 106a are embedded have occurred even before the lighting for unknown reasons.

In view of this, for suppressing this kind of fracture in the sealing portions 103 and 104, various techniques have been known conventionally. For example, in the case of an arc tube 201 shown in FIG. 16, single-layer coil members 202 and 203 are wrapped around the embedded portions of the electrode bars 105a and 106a, and embedded in the sealing portions 103 and 104, respectively. Thus, the stress applied to the sealing portions 103 and 104 caused by the difference in thermal expansion between the quartz glass and the electrode bars 105a and 106a can be relieved (see Patent Document 2).

Furthermore, for suppressing the occurrence and growth of the microcracks caused by the gap X shown in the enlarged cross-sectional view of the region A in FIG. 15, techniques to reduce or remove said gap X by improving the shape of the metal-foil 107 that is connected to the electrode bar 105a have been disclosed in Patent Documents 1, 3 to 5 and the like. Examples of the techniques include: (1) in the metal-foil 107, a portion connected to the electrode bar 105a is narrowed down; and (2) the narrowed metal-foil 107 is wrapped around a part of the outer peripheral surface of the electrode bar 105a.

Patent document 1: JP 3570414
Patent document 2: JP 11-176385 A
Patent document 3: JP 3518533
Patent document 4: JP 2004-265753 A
Patent document 5: JP 2004-296178 A

DISCLOSURE OF INVENTION

Problem to be Solved by the Invention

Recently, a higher brightness and higher color rendering property have been demanded with respect to high-pressure discharge lamps mounted in the projection-type image display devices. In response to these demands, there has been a growing trend to increase the amount of filled mercury for the purpose of increasing a mercury vapor pressure in the arc tube.

In view of the above, the inventors of the present invention examined the high-pressure discharge lamp with a rated power of 300 W by setting the amount of filled mercury to 0.35 mg/mm$^3$, and targeting the rated lifetime up to 2000-hour. At that time, because of the concern for the fracture in the sealing portion, all of the above conventional techniques were applied for preventing its occurrence. However, in every trial lot of the lamps with the above conventional techniques applied thereto, 20% to 50% of the sealing portions were fractured by the time the targeted rated lifetime of 2000-hour was reached.

The present invention has been achieved in view of the above situation, and an object is to provide a high-pressure discharge lamp capable of further suppressing the fracture in the sealing portion.

Means for Solving Problem

A high-pressure discharge lamp according to the present invention has an arc tube made of quartz glass including a light-emitting portion that fills mercury inside thereof and has a pair of electrodes arranged so as to face each other, and a sealing portion connected to the light-emitting portion, wherein the pair of electrodes respectively have an electrode bar, one end of the electrode bar is located in an internal space of the light-emitting portion, the other end of the electrode bar is embedded in the sealing portion and bonded to a conductive metal-foil sealed in the sealing portion, and in at least a part of a portion of the electrode bar embedded in the sealing portion, an entire outer peripheral surface thereof is covered tightly with a metal-foil sleeve.

Further, a high-pressure discharge lamp according to the present invention having another configuration includes an arc tube made of quartz glass including a light-emitting portion that fills mercury inside thereof and has a pair of electrodes arranged so as to face each other, and a sealing portion connected to the light-emitting portion, wherein the pair of electrodes respectively have an electrode bar, one end of the electrode bar is located in an internal space of the light-emitting portion, the other end of the electrode bar is embedded in the sealing portion and bonded to a conductive metal-foil sealed in the sealing portion, a narrow foil piece part having a width narrower than that of the other portion is formed at an end of the conductive metal-foil, in at least a part of a portion of the electrode bar embedded in the sealing portion, a part of an outer peripheral surface thereof in a circumferential direction is covered tightly with the narrow foil piece part, and in the narrow foil piece part and the electrode bar, an entire outer peripheral surface of a region corresponding to the narrow foil piece part is covered with a metal-foil sleeve.

Here, the phrase "a pair of electrodes arranged so as to face each other" includes not only the case in which the respective axes of the electrodes in the longitudinal direction are aligned perfectly, but also the case in which these axes are displaced due to the variation in assembly or the like.

The phrase "a portion of the electrode bar embedded in the sealing portion" refers to a portion of the electrode bar from a point where the electrode bar starts contacting the quartz glass, which is a constituent material of the sealing portion, to the end of the electrode bar on the side connected to the metal-foil.

The phrase "tightly covered" refers to a state in which the metal-foil sleeve substantially covers the electrode bar so as not to create any gap therebetween. This means that, for example, in the case where the electrode bar is inserted into the metal-foil sleeve, the diameter of the electrode bar is equal to the internal diameter of the metal-foil sleeve. However, in view of the variation in processing, for example, the internal diameter of the metal-foil sleeve practically is set slightly larger than the diameter of the electrode bar. Therefore, the phrase "tightly covered" also refers to this case, although gaps are formed partially.

Further, the wording "covered" includes the case in which the electrode bar is covered by being inserted into the metal-foil preformed in a sleeve shape, the case in which the electrode bar is covered by being wrapped with a metal-foil sheet, and the like. It should be noted that, as described later, this "metal-foil sleeve" is composed of a different member functioning as a buffering member having mechanical elasticity. Therefore, the feature of the above is essentially different from an electrode bar obtained by processing itself, such as an electrode bar plated with a desired material and an electrode bar with the surface thereof modified, and they are not included herein.

Effects of the Invention

According to the present invention, it is possible sufficiently to relieve the stress applied to the sealing portion caused by the difference in thermal expansion coefficient between the electrode bars and the quartz glass. As a result of this, the occurrence of microcracks in the sealing portion can be suppressed surely, and the fracture in the sealing portion can be suppressed effectively.

Figure 1:
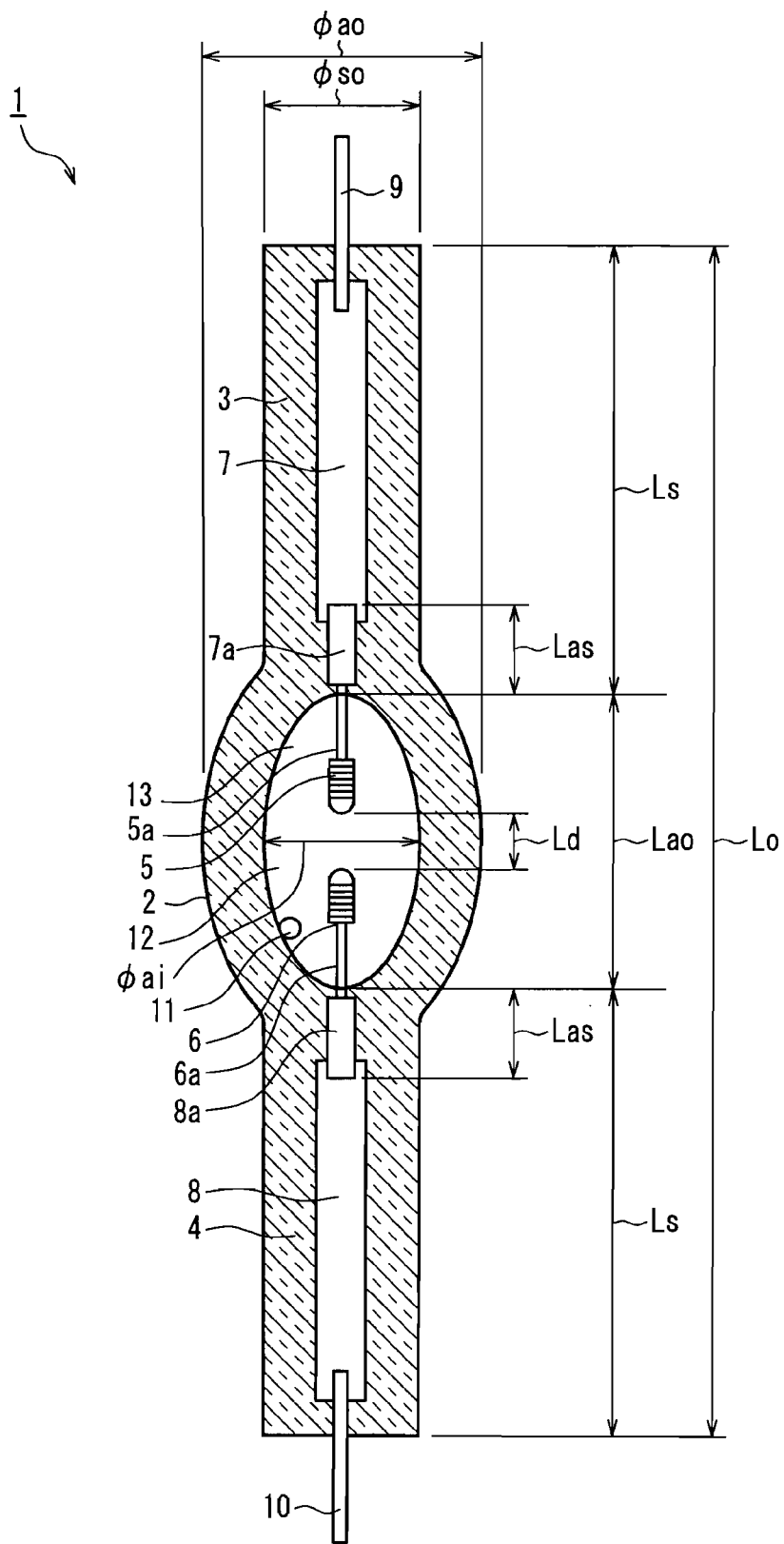
FIG. 1 is a cross-sectional view showing a configuration of an arc tube in a high-pressure mercury lamp according to Embodiment 1 of the present invention.

| Explanation of Reference Numerals | |
|---|---|
| 1 | arc tube |
| 2 | light-emitting portion of arc tube |
| 3, 4 | sealing portion of arc tube |
| 5, 6 | electrode |
| 5a, 6a | electrode bar |
| 5ae, 7ae | welding portion |
| 5b | coil |
| 5c | melting portion |
| 7, 8, 14, 15 | conductive metal-foil |
| 7a, 8a, 14a, 14i, 16a | metal-foil sleeve |
| 7b, 16b | metal-foil piece |
| 7e, 14e | rear-end welding portion |
| 7t, 14t | front-end welding portion |
| 9, 10 | external Mo lead wire |
| 11 | mercury |
| 12 | argon |
| 13 | bromine |
| 14b | metal-foil piece portion |
| 14c, 14d | slit |
| 15a | wide part |
| 15b | narrow foil piece part |
| 16 | electrode |
| 20 | high-pressure mercury lamp |
| 21 | power source-connecting terminal |
| 22 | cylindrical metal-cap |
| 23 | lamp unit |
| 24 | reflection mirror |
| 25 | lead wire |
| 26 | through-hole |
| 30 | front projector |
| 31 | housing |
| 32 | optical unit |

| Explanation of Reference Numerals | |
|---|---|
| 33 | control unit |
| 34 | projection lens |
| 35 | cooling fan unit |
| 36 | power source unit |
| 40 | rear projector |
| 41 | housing |
| 42 | translucent screen |

DESCRIPTION OF PREFERRED EMBODIMENTS

Based on the configuration described above, the high-pressure discharge lamp of the present invention can assume the following characteristics.

That is, a region of the electrode bar covered with the metal-foil sleeve can include at least a portion of the electrode bar that overlaps with the conductive metal-foil.

Further, it is possible to employ a configuration in which a metal-foil piece portion is provided at the end of the conductive metal-foil, and the metal-foil piece portion is wrapped around the electrode bar to form the metal-foil sleeve.

Still further, it is possible to employ a configuration in which the metal-foil piece portion is fixed to the electrode bar at least one spot by welding, and the spot at which the metal-foil piece portion is fixed by the welding is covered with another portion of the metal-foil piece portion.

Still further, it is possible to employ a configuration in which, when the electrode bar is made of tungsten, the metal-foil sleeve is composed of any one of molybdenum, niobium, rhenium, tungsten and tantalum, or composed of an alloy containing any one of molybdenum, niobium, rhenium, tungsten and tantalum as a main component.

Still further, a lamp unit according to the present invention includes the high-pressure discharge lamp having any one of the configurations described above, and a reflection mirror that has a concave reflecting surface, wherein the high-pressure discharge lamp is attached to the reflection mirror in such a manner that light emitted by the high-pressure discharge lamp is reflected by the reflecting surface.

Still further, a projection-type image display device according to the present invention includes the lamp unit having any one of the configurations described above, an optical unit that forms an optical image by modulating illumination light from the lamp unit, and a projection device that enlarges and projects the optical image.

Hereinafter, embodiments of the present invention will be described specifically with reference to the drawings.

Embodiment 1

FIG. 1 shows a configuration of an arc tube in a high-pressure mercury lamp having a rated power of 300 W according to Embodiment 1 of the present invention. The basic configuration of this arc tube is identical to that of the above-described conventional arc tube, except that a sealing portion is improved.

A vessel of an arc tube 1 is made of quartz glass. The arc tube 1 includes a substantially spheroidal light-emitting portion 2 in the central portion thereof, and substantially columnar sealing portions 3 and 4 that are connected respectively with both sides of the light-emitting portion 2 and extend outward. Inside the light-emitting portion 2, a pair of electrodes 5 and 6 made of tungsten (W) are disposed opposite to each other. In the sealing portions 3 and 4, embedded portions of electrode bars 5a and 6a (circular in lateral cross-section) constituting a part of the electrodes 5 and 6 are sealed by a so-called drawing sealing process. As described later, the embedded portions utilize a configuration that characterizes the present embodiment.

Additionally in the sealing portions 3 and 4, conductive metal-foils 7 and 8 made of molybdenum (Mo), to which the rear ends of the electrode bars 5a and 6a are bonded respectively by welding, are sealed airtightly. At the other ends of the conductive metal-foils 7 and 8 opposite to the ends bonded to the electrode bars 5a and 6a, external lead wires 9 and 10 made of molybdenum (Mo) are bonded, respectively, and drawn out of the arc tube 1.

Inside the arc tube 1, predetermined amounts of mercury (Hg) 11 as a light-emitting material, argon (Ar) 12 as starting-assistant rare gas, and further bromine (Br) 13 as a halogen are filled. The specific configuration of the arc tube 1 will be described in detail.

The light-emitting portion 2 has a substantially spheroidal shape, and the dimensions thereof are set to, for example, an internal diameter $\phi$ ai of the central portion: 5.0 mm; an outer diameter $\phi$ ao: 12.0 mm; a shaft length inside the tube Lao: 8.0 mm; and an internal capacity Vai: 0.1 cc. The sealing portions 3 and 4 have a substantially columnar shape, and the dimensions thereof are set to an outer diameter $\phi$ so: 5.8 mm; a total length Ls: 30 mm. In this case, a total length Lo of the arc tube 1 becomes 68 mm. Further, the distance between the electrodes 5 and 6, that is, an interelectrode distance Ld is set to 1.2 mm. Furthermore, the amount of filled mercury 11 is set to 35 mg (0.35 mg/mm$^3$) in total weight, the amount of filled argon 12 is set to 30 kPa (at room temperature), and bromine 13 is set to $0.5 \times 10^{-3}$ µmol in total weight.

Figure 2A:
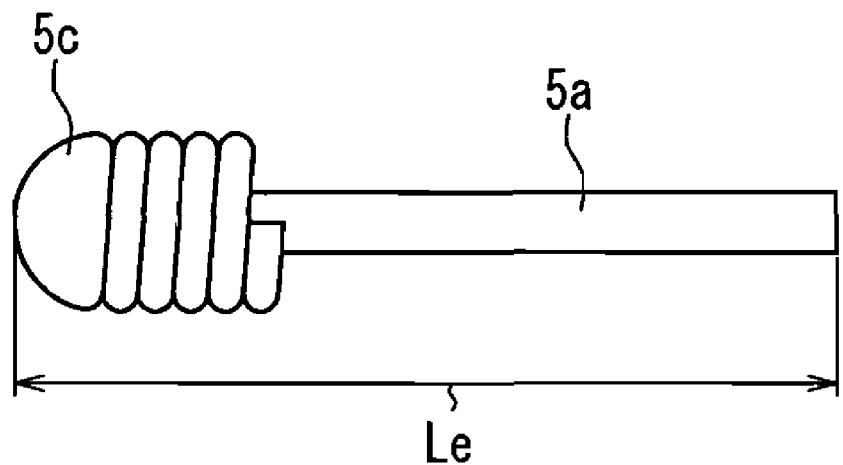
FIG. 2A is a front view showing a configuration of an electrode used in the arc tube.
Figure 2B:
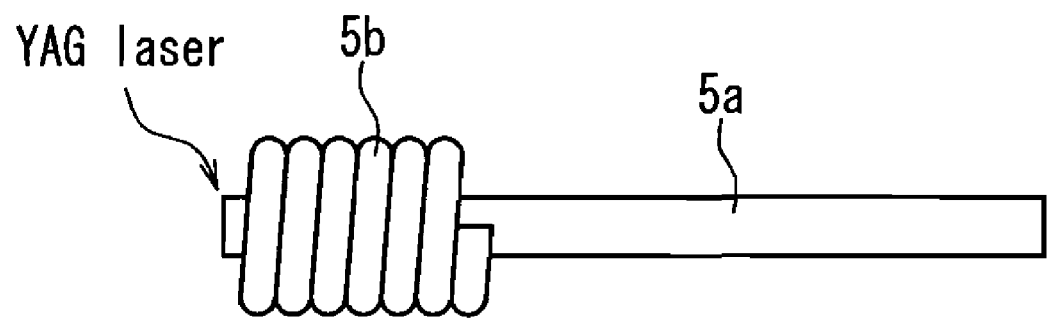
FIG. 2B is a front view showing a manufacturing process of the electrode.

As shown in FIG. 2A in an enlarged state, the electrode 5 is configured so that a front end 5c thereof forms, for example, a substantially hemispherical shape (the same applies to the electrode 6). Such a configuration is based on the conventional art and, as exemplarily shown in FIG. 2B, is manufactured by first attaching a double-layer coil 5b (diameter of W-wire: 0.30 mm, winding number of the coil: 7) made of tungsten (W) to the front end of the electrode bar 5a (circular in cross-section, having a bar diameter of 0.50 mm) and then melting the front ends of the electrode bar 5a and the coil 5b with a YAG laser or the like.

As shown in FIG. 1, regarding this electrode 5, one end thereof provided with the electrode bar 5a having the melting portion 5c is located in an internal space of the light-emitting portion 2, and the other end thereof (rear end part) is embedded in the sealing portion 3.

The dimensions of the electrode 5 are set to, for example, a total length Le: 7.5 mm; and an embedded portion length Las of the electrode bar 5a in the sealing portion 3 (see FIG. 1): 3.8 mm. The value of Las can be selected from the range of 2.5 to 4.0 mm.

Figure 3:
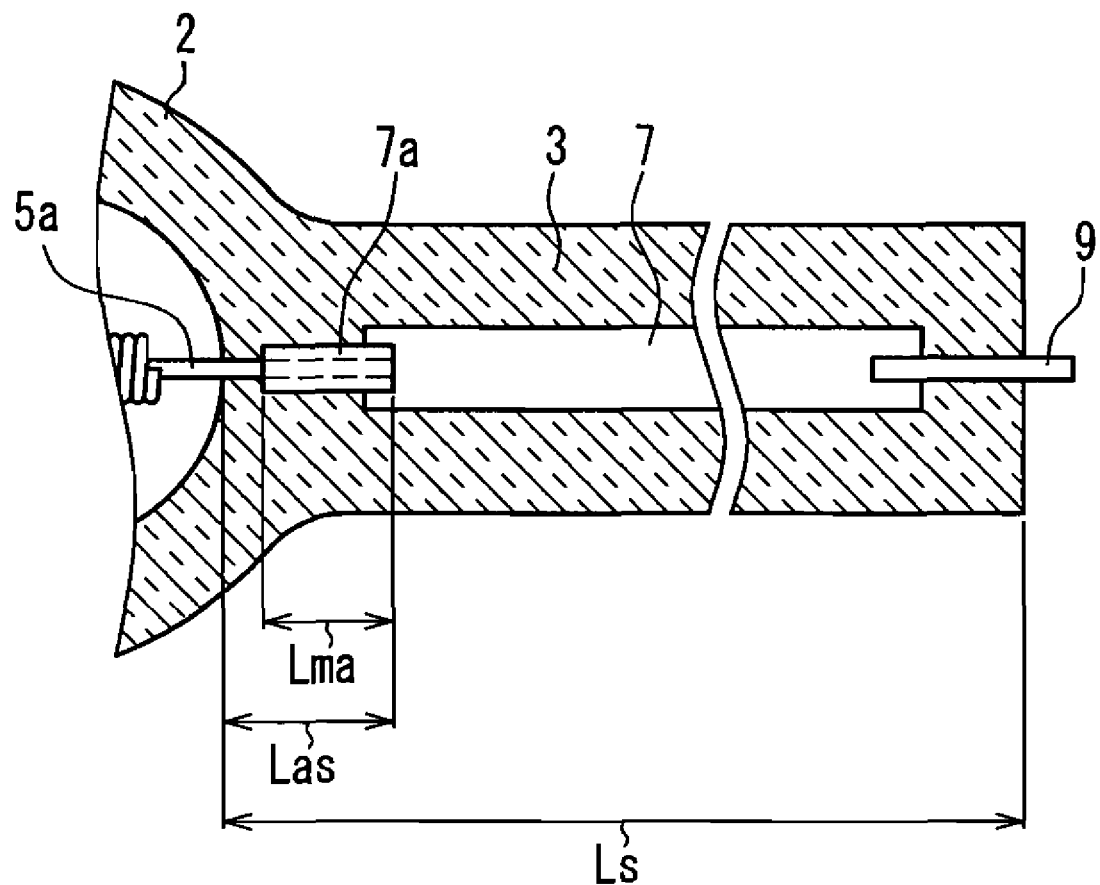
FIG. 3 is a cross-sectional partial view showing a configuration of a sealing portion of the arc tube.

Next, a configuration of the embedded portion of the electrode 5 will be described specifically (the same applies to the electrode 6). As shown in FIG. 3 in an enlarged state, the entire outer peripheral surface of a part of the electrode bar 5a embedded in the sealing portion 3 is covered tightly with the metal-foil 7a. The metal-foil 7a is made of, for example, thin molybdenum (Mo) having a thickness of 20 µm and is in a sleeve shape (cylindrical shape).

Next, members to be sealed in the sealing portion 3 of the arc tube 1 and the assembling process in the present embodiment will be described with reference to FIGS. 4A to 4D (the same applies to the sealing portion 4).

Figure 4A:
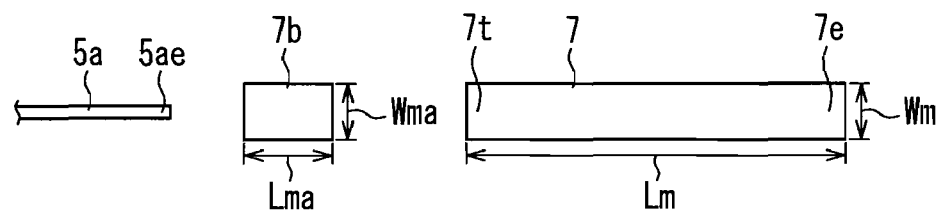
FIG. 4A is a plan view showing members used in the sealing portion of the arc tube and the assembling process thereof.
Figure 4B:
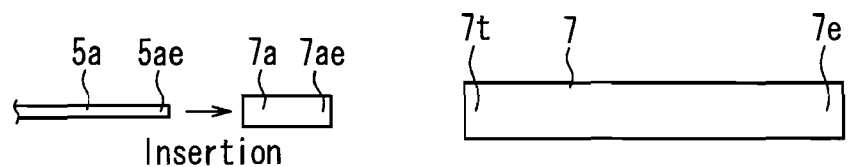
FIG. 4B is a plan view showing a process next to FIG. 4A.
Figure 4C:
FIG. 4C is a plan view showing a state resulted from the process of FIG. 4B.

First, as shown in FIG. 4A, the conductive metal-foil 7 in a rectangular strip shape and a separate rectangular metal-foil piece 7b that can be formed in a cylindrical shape relatively easily are produced. Then, the metal-foil piece 7b is processed into the metal-foil sleeve 7a as shown in FIG. 4B. After that, the electrode bar 5a is inserted into the metal-foil sleeve 7a from the rear-end-side thereof to obtain a state shown in FIG. 4C. The rear-end-side of the electrode bar 5a will serve as a welding portion 5ae with respect to the conductive metal-foil 7. At this time, the rear end of the welding portion 5ae is positioned so as to coincide with the rear end of the metal-foil sleeve 7a. Then, the metal-foil sleeve 7a is fixed to the electrode bar 5a by resistance welding or the like.

Figure 4D:
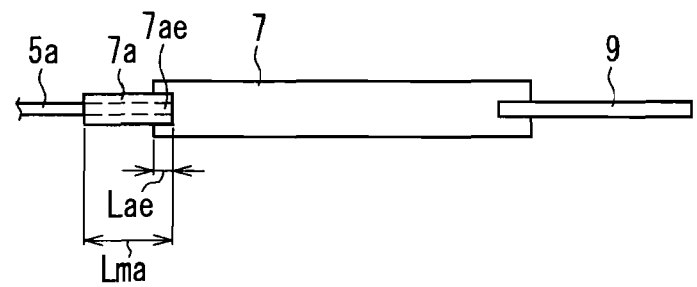
FIG. 4D is a plan view showing a process next to FIG. 4B.

Next, as shown in FIG. 4D, the welding portion 5ae of the electrode bar 5a and the welding portion 7ae of the metal-foil 7a are bonded to a front-end welding portion 7t of the conductive metal-foil 7 simultaneously by resistance welding or the like. Lastly, the external lead wire 9 is bonded to a rear-end welding portion 7e of the conductive metal-foil 7.

It should be noted that, in one example, the dimensions of the conductive metal-foil 7 were set to: a total length Lm shown in FIG. 4A: 18 mm; a width Wm: 1.5 mm; and a thickness tm: 20 µm, respectively. The dimensions of the rectangular metal-foil piece 7b were set to: a length Lma: 3.0 mm; a width Wma: 2.0 mm; and the thickness tm: 20 µm, respectively. The dimensions of the metal-foil sleeve 7a were set to: the length Lma: 3.0 mm; and a cylindrical internal diameter $\phi$ si: 0.51 mm, respectively. The lengths Lae of the rear-end welding portion 5ae of the electrode bar 5a and the rear-end welding portion 7ae of the metal-foil sleeve 7a were set to 0.6 mm, respectively (see FIG. 4D).

In FIGS. 4A to 4D, instead of processing the rectangular metal-foil piece 7b into the metal-foil sleeve 7a, a seamless metal-foil sleeve 7a may be used from the beginning.

As described above, according to the configuration of the high-pressure mercury lamp of Embodiment 1, the metal-foil sleeves 7a and 8a are interposed between the quartz glass in the sealing portions 3 and 4 and the electrode bars 5a and 6a. Thus, the metal-foil sleeves 7a and 8a function as buffering members having mechanical elasticity, whereby the stress applied to the sealing portions 3 and 4 caused by the difference in thermal expansion coefficient with respect to the electrode bars 5a and 6a can be relieved (absorbed) greatly. Therefore, in the sealing process, the occurrence of microcracks in the regions of the sealing portions 3 and 4 itself can be suppressed effectively. Furthermore, even if stress is caused due to the increased amount of the filled mercury and the raised vapor pressure inside the arc tube 1 at the time of lighting, this stress also can be relieved by the metal-foil sleeves 7a and 8a. Moreover, even if the microcracks occur, the growth can be suppressed, whereby the fracture in the sealing portions 3 and 4 surely can be suppressed.

As described above, in the portions of the electrode bars 5a and 6a positioned in the region of the gap X (see FIG. 15), relatively large microcracks may occur. Therefore, preferably, the regions of the electrode bars 5a and 6a covered with the metal-foil sleeves 7a and 8a substantially include the portions of the electrode bars 5a and 6a which overlap with the conductive metal-foils 7 and 8.

Further, preferably, the metal-foil sleeves 7a and 8a are composed of any one of molybdenum, niobium (Nb), rhenium (Re), tungsten (W) and tantalum (Ta), or composed of an alloy containing any one of them as a main component. Thus, the metal-foil sleeves 7a and 8a can attain sufficient heat resistance.

Furthermore, preferably, the thicknesses of the metal-foil sleeves 7a and 8a are set to 40μ or less as the maximum value. The minimum value thereof preferably is 10 μm or more for practical purposes.

Next, an experiment performed to confirm the functional effects of the high-pressure mercury lamp according to the present embodiment will be described below.

With respect to the arc tube 1 (20 units) of the high-pressure mercury lamp according to the above-described Embodiment 1, the lifetime test was conducted using a configuration of a lamp unit 23 of the later-described Embodiment 7 shown in FIG. 12, and the fracture condition of the sealing portions 3 and 4 in the arc tube 1 was observed. The lamp unit 23 in the lifetime test was lighted, with the arc tube 1 being kept horizontally. Switching on/off of the arc tube 1 was performed by the repetition of a cycle of switching on the arc tube 1 for three hours with a rated power of 300 W at a square wave current having a frequency of 100 Hz, and switching off the arc tube 1 for half an hour.

Figure 15:
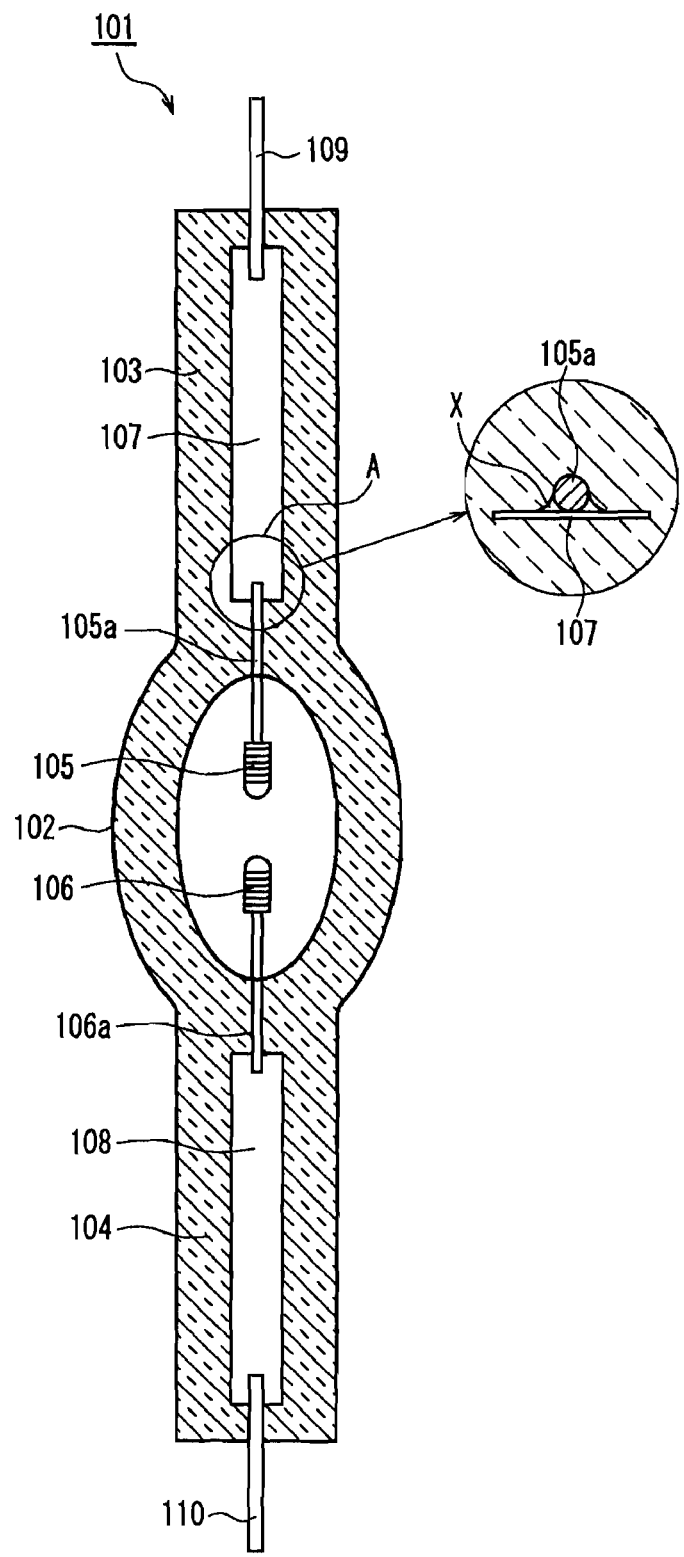
FIG. 15 is a cross-sectional view showing a configuration of a conventional arc tube in a high-pressure mercury lamp.
Figure 16:
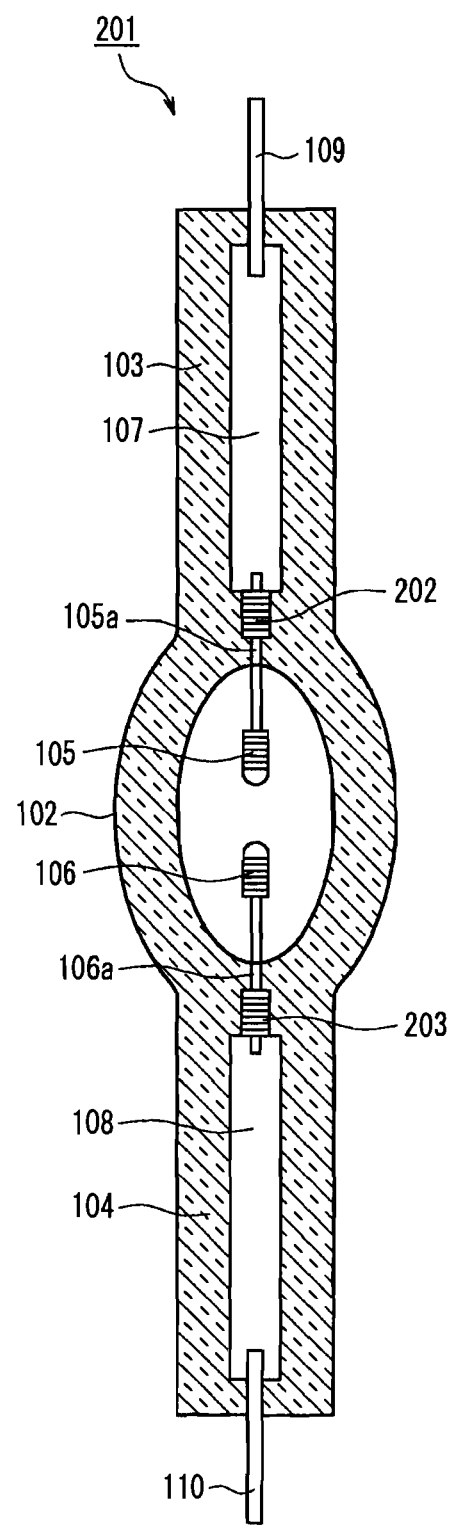
FIG. 16 is a cross-sectional view showing a configuration of a conventional arc tube of a high-pressure mercury lamp having means for suppressing the fracture in a sealing portion.

For comparison, two kinds of comparative arc tubes 101 and 201 provided with conventional sealing portions, respectively shown in FIGS. 15 and 16, were prepared, and the fracture conditions of the sealing portions also were observed in the lifetime test, in the same manner as the arc tube 1 of the present embodiment.

Specifically, the comparative arc tube 101 (FIG. 15) was configured in the same way as in the arc tube 1 except that the metal-foil sleeves 7a and 8a respectively covering the electrode bars 5a and 6a were removed from the sealing portions of the arc tube 1 of the present embodiment shown in FIG. 3. Further, the comparative arc tube 201 (FIG. 16) was configured in the same way as in the arc tube 1 except that the electrode bars 105a and 106a respectively wrapped with single-layer coil members 202 and 203 (wire diameter: 0.1 mm, winding number of the coil: 30) made of molybdenum (Mo) were embedded in the sealing portions, instead of the metal-foil sleeves 7a and 8a in the sealing portions of the arc tube 1 of the present embodiment shown in FIG. 3.

Further, configurations of the lamps and the lamp units equipped with the comparative arc tubes 101 and 201 were set completely in the same way as in a lamp 20 and a lamp unit 23 of Embodiment 7.

Table 1 shows the number of lamps in which sealing portions are fractured by the time when each accumulated lighting time up to the rated lifetime of 2000-hour is reached, regarding the arc tube 1 of the present embodiment and the comparative arc tubes 101, 201.

was started at the accumulated lighting time of 100-hour, and 10 lamps out of 20 lamps were fractured at the time of 2000-hour.

On the other hand, as to the arc tube of Embodiment 1, even at the rated lifetime of 2000-hour, no fractures occurred in the sealing portions 3 and 4. Moreover, the sealing portions 3 and 4 of the arc tube 1 were inspected visually, and no microcracks were found in the embedded portions of the electrode bars 5a and 6a.

As a result of this experiment, it was confirmed that the metal-foil sleeves 7a and 8a tightly covering the electrode bars 5a and 6a were able to greatly relieve the stress caused by the difference in thermal expansion coefficient applied to the sealing portions 3 and 4. Therefore, the metal-foil sleeves 7a and 8a were proved to have functioned effectively as buffering members having high mechanical elasticity.

Embodiment 2

An arc tube according to Embodiment 2 of the present invention will be described with reference to FIGS. 5A-5C and 6. Although the arc tube of the present embodiment has a sealing portion configuration different from that of the arc tube 1 in Embodiment 1, it is configured in the same way except for the sealing portion. Therefore, the following descriptions will be made with reference to FIGS. 1, 4A-4D and 12, using the same reference numerals as those in Embodiment 1 regarding the respective elements identical to those in Embodiment 1. The elements different from those in Embodiment 1 are portions relevant to the conductive metal-foils 7 and 8, the metal-foil sleeves 7a and 8a, and the metal-foil piece 7b. In FIGS. 5A-5C and 6, the elements corresponding to these portions are shown, for example, as a conductive metal-foil 14, a metal-foil sleeve 14a, and a metal-foil piece portion 14b.

Figure 5A:
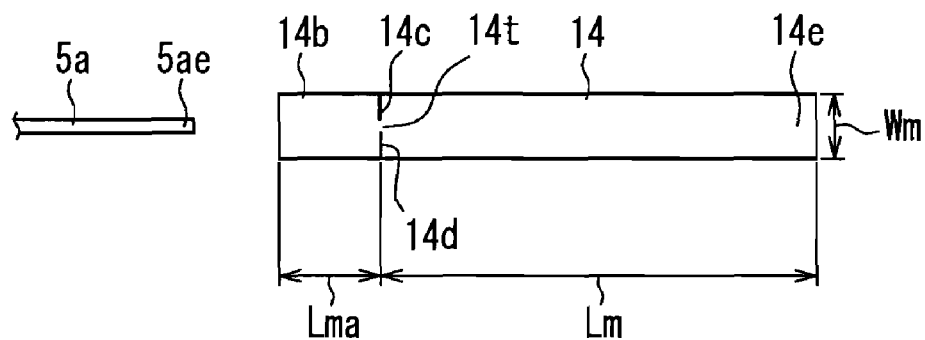
FIG. 5A is a plan view showing members used in a sealing portion of an arc tube in a high-pressure mercury lamp according to Embodiment 2 of the present invention and the assembling process thereof.
Figure 5B:
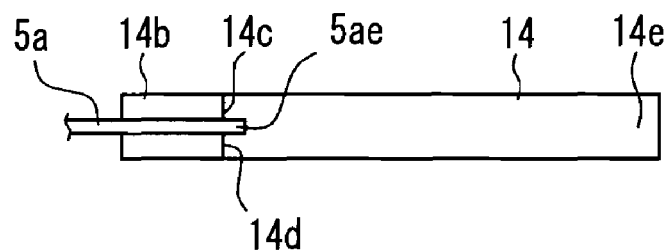
FIG. 5B is a plan view showing a process next to FIG. 5A.
Figure 5C:
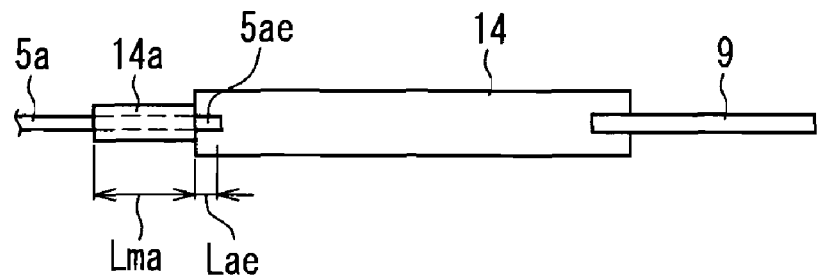
FIG. 5C is a plan view showing a process next to FIG. 5B.

FIGS. 5A to 5C show members to be sealed in the sealing portion 3 of the arc tube and the assembling process (the same applies to the sealing portion 4). Instead of the metal-foil piece 7b in Embodiment 1, the arc tube of the present embodiment includes a metal-foil piece portion 14b at the end of the conductive metal-foil 14. That is, as shown in FIG. 5A, in a front-end welding portion 14t of the front-end portion of the conductive metal-foil 14, slits 14c and 14d are made on opposing edges. Thus, a rectangular metal-foil piece portion 14b that can be formed in a cylindrical shape relatively easily is formed.

TABLE 1

Total number of lamps in which sealing portions
are fractured per arc tube in lifetime test

| | Accumulated lighting time (hours) | | | | | | | |
|---|---|---|---|---|---|---|---|---|
| | 1 | 100 | 300 | 500 | 800 | 1200 | 1600 | 2000 |
| Comparative arc tube 101 | 2 | 3 | 6 | 9 | 11 | 12 | 13 | 14 |
| Comparative arc tube 201 | 0 | 1 | 3 | 5 | 7 | 8 | 9 | 10 |
| Arc tube (Embodiment 1) | 0 | 0 | 0 | 0 | 0 | 0 | 0 | 0 |
| Arc tube (Embodiment 2) | 0 | 0 | 0 | 0 | 0 | 0 | 0 | 0 |

(Number of lamps per arc tube in the lifetime test is 20.)

As is clear from Table 1, as to the comparative arc tube 101, the fracture in the sealing portion was started at the accumulated lighting time of 1-hour, and 14 lamps out of 20 lamps were fractured at the time of 2000-hour. Further, as to the comparative arc tube 201, the fracture in the sealing portion Next, as shown in FIG. 5B, a rear-end welding portion 5ae of the electrode bar 5a is bonded to the front-end welding portion 14t by resistance welding or the like. Then, as shown in FIG. 5C, a particular part of the embedded portion of the electrode bar 5a is wrapped with the metal-foil piece portion 14b in the form of the metal-foil sleeve 14a so that the entire outer peripheral surface of the part is covered tightly. Lastly, the metal-foil sleeve 14a is bonded and fixed to the electrode bar 5a by resistance welding or the like.

It should be noted that, in one example, the dimensions of the conductive metal-foil 14 were set to: the total length Lm: 18 mm, the width Wm: 1.8 mm, and the thickness tm: 20 μm, respectively. The length Lma of the rectangular the metal-foil piece portion 14b was set to 2.7 mm. The dimensions of the metal-foil sleeve 14b were set to: the length Lma: 2.7 mm, and the cylindrical internal diameter ϕ si: 0.51 mm, respectively. The length Lae of the rear-end welding portion 5ae of the electrode bar 5a bonded to the front-end welding portion 14t of the conductive metal-foil 14 was set to 0.6 mm. This rear-end welding portion 5ae is neither wrapped nor covered with the metal-foil sleeve 14a. Moreover, an external lead wire 9 is bonded to a rear-end welding portion 14e of the conductive metal-foil 14 by resistance welding or the like.

Figure 6:
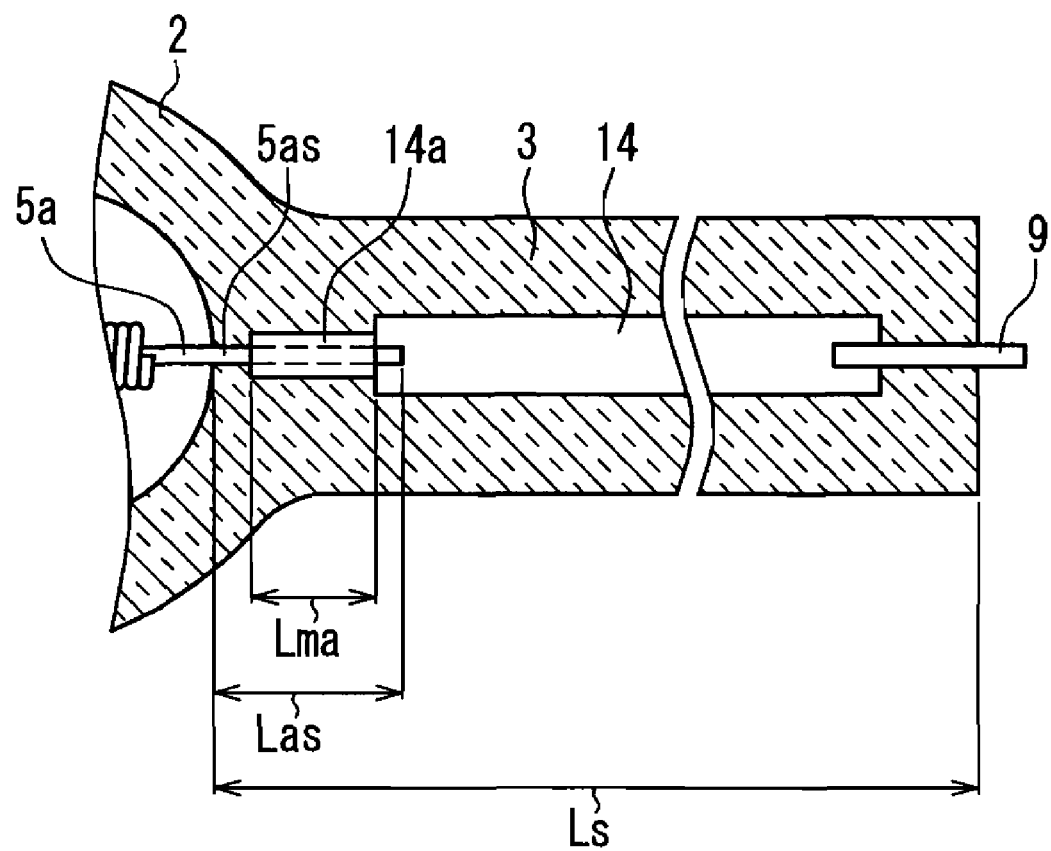
FIG. 6 is a cross-sectional partial view showing a configuration of a sealing portion of the arc tube.

Next, FIG. 6 shows a state in which the assembled members including the electrode bar 5a, the conductive metal-foil 14 and the metal-foil piece portion 14b thereof, and the external lead wire 9 are sealed in one sealing portion 3 (the same applies to the sealing portion 4). Here, the length Las of the embedded portion of the electrode bar 5a is 3.8 mm, and the length Lma of the metal-foil sleeve 14a is 2.7 mm.

With respect to such an arc tube (20 units) in the high-pressure mercury lamp according to Embodiment 2, the lifetime test was conducted using a completed lamp unit, and the fracture conditions of the sealing portions 3 and 4 of the arc tube were observed. At this time, the conditions of the lifetime test were set similarly to those of the lifetime test of the arc tube 1 according to the above-described Embodiment 1. As a result of this experiment, as also shown in Table 1, no fractures occurred in the sealing portions 3 and 4 of the arc tube of Embodiment 2 even at the rated lifetime of 2000-hour, and no microcracks were found by the visual inspection, in the same way as in the arc tube 1 of Embodiment 1.

As described above, according to the configuration of Embodiment 2, the metal-foil sleeve 14a functions as a buffering member having mechanical elasticity when being interposed between the electrode bar 5a and the quartz glass in the sealing portion 3 (hereinafter, the same applies to the sealing portion 4), in the same way as in the configuration of the high-pressure mercury lamp according to Embodiment 1. Because of this, the stress applied to the sealing portion 3 caused by the difference in thermal expansion coefficient with respect to the electrode bar 5a can be relieved (absorbed) greatly. Therefore, in the sealing process, the occurrence of microcracks in the region of the sealing portion 3 itself can be suppressed effectively. Moreover, even if stress is caused due to the increased amount of the filled mercury and the raised vapor pressure inside the arc tube 1 at the time of lighting, this stress also can be relieved by the metal-foil sleeve 14a. Therefore, even if the microcracks occur, the growth can be suppressed, whereby the fracture in the sealing portion 3 can be suppressed surely.

Embodiment 3

An arc tube according to Embodiment 3 of the present invention will be described with reference to FIGS. 7A-7D. The arc tube of the present embodiment is obtained by modifying the configuration of the sealing portion of the arc tube in Embodiment 2, and is configured in the same way except for the sealing portion. Therefore, the following descriptions will be made using the same reference numerals as those in Embodiment 2 regarding the elements identical to those in Embodiment 2. FIGS. 7A-7D show members to be sealed in the sealing portion 3 (see FIG. 6, the same applies to the sealing portion 4) of the arc tube and the assembling process thereof.

Figure 7A:
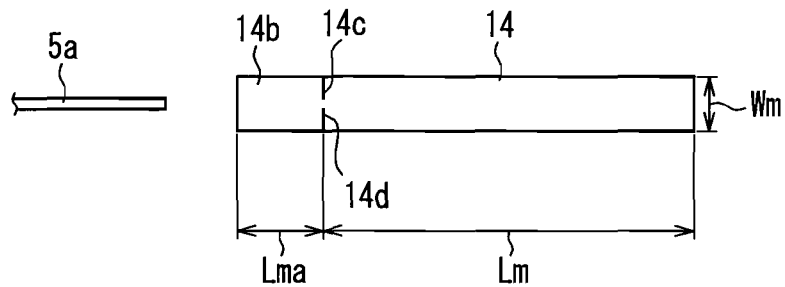
FIG. 7A is a plan view showing members used in a sealing portion of an arc tube in a high-pressure mercury lamp according to Embodiment 3 of the present invention and the assembling process thereof.

First, as shown in FIG. 7A, a metal-foil piece portion 14b is formed at the end of a conductive metal-foil 14 in the same way as shown in FIG. 5A of Embodiment 2.

Figure 7B:
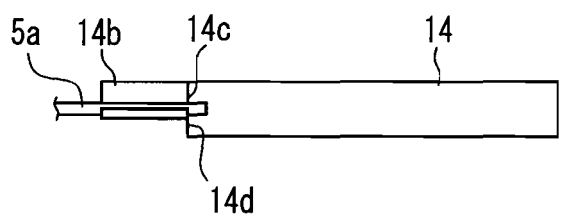
FIG. 7B is a plan view showing a process next to FIG. 7A.
Figure 7C:
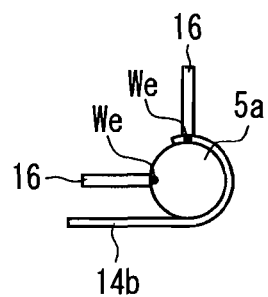
FIG. 7C is an enlarged-lateral cross-sectional view of FIG. 7B.

Next, as shown in FIGS. 7B and 7C, an electrode bar 5a is placed on the metal-foil piece portion 14b along a longitudinal centerline of the conductive metal-foil 14. Further, one side part of the metal-foil piece portion 14b on the slit 14d side is wrapped around the electrode bar 5a. FIG. 7C is a lateral cross-sectional view with a section of the metal-foil piece portion 14b in FIG. 7B enlarged. In this state, the metal-foil piece portion 14b is bonded to the electrode bar 5a at welding spots We by resistance welding or the like using electrodes 16.

Figure 7D:
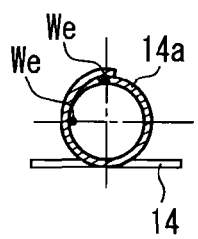
FIG. 7D is an enlarged-lateral cross-sectional view showing a process next to FIG. 7B.

Furthermore, as shown in FIG. 7D, the other side part of the metal-foil piece portion 14b on the slit 14c side is wrapped around the electrode bar 5a. Thus, the metal-foil piece portion 14b is wrapped around the entire outer peripheral surface of the electrode bar 5a so as to form a metal-foil sleeve 14a. In this state, the shape and the size of the metal-foil piece portion 14b and the relation of the welding spots We are set so that the other side part of the metal-foil piece portion 14b on the slit 14c side covers the welding spots We.

As described above, when the welding spots We of the metal-foil piece portion 14b are covered with another portion of the metal-foil piece portion 14b, the effect of suppressing the occurrence of microcracks in the sealing portion by the metal-foil sleeve 14a can be improved. The reason for this is as follows: since the metal-foil sleeve 14a is fixed to the electrode bar 5a at the welding spots We, this limits the function of the metal-foil sleeve 14a as a buffering member. Therefore, if the welding spots We are exposed and come into contact with the sealing glass, the effect of relieving the stress caused by the difference in thermal expansion coefficient by the buffering function of the metal-foil sleeve 14a is reduced in that region. On the contrary, if the welding spots We are covered with different portions of the metal-foil piece portion 14b, such a disadvantageous situation can be avoided.

Embodiment 4

An arc tube according to Embodiment 4 of the present invention will be described with reference to FIGS. 8A-8D. The present embodiment shows another exemplary method of manufacturing the sealing portion of the arc tube in Embodiment 3. Therefore, the following descriptions will be made using the same reference numerals as those in Embodiment 3 regarding the respective elements identical to those in Embodiment 3. FIGS. 8A to 8D show members to be sealed in the sealing portion 3 (see FIG. 6, the same applies to the sealing portion 4) of the arc tube and the assembling process thereof.

Figure 8A:
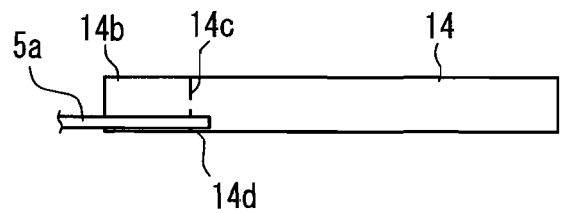
FIG. 8A is a plan view showing members used in a sealing portion of an arc tube in a high-pressure mercury lamp according to Embodiment 4 of the present invention and the assembling process thereof.

First, as shown in FIG. 8A, a metal-foil piece portion 14b is formed at the end of a conductive metal-foil 14 in the same way as in FIG. 7A of Embodiment 3.

Figure 8B:
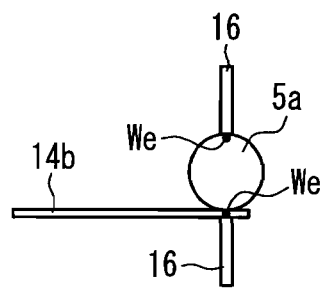
FIG. 8B is an enlarged-lateral cross-sectional view of FIG. 8A.

Next, as shown in FIGS. 8A and 8B, an electrode bar 5a is placed along an edge of one side part of the metal-foil piece portion 14b on the slit 14d side. FIG. 8B is an enlarged-lateral cross-sectional view of a section of the metal-foil piece portion 14b in FIG. 8A. In this state, the metal-foil piece portion 14b is bonded to the electrode bar 5a at welding spots We by resistance welding or the like.

Figure 8C:
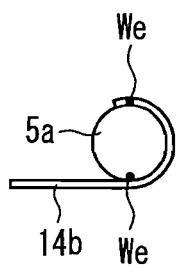
FIG. 8C is an enlarged-lateral cross-sectional view showing a process next to FIG. 8A.

Next, as shown in FIG. 8C, the electrode bar 5a is turned to a position along the centerline of the metal-foil piece portion 14b, while being wrapped with the metal-foil piece portion 14b.

Figure 8D:
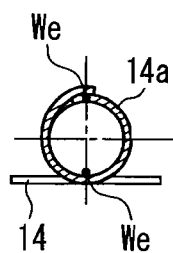
FIG. 8D is an enlarged-lateral cross-sectional view showing a process next to FIG. 8C.

Further, as shown in FIG. 8D, the other side part of the metal-foil piece portion 14b on the slit 14c side is wrapped around the electrode bar 5a. Thus, the metal-foil piece portion 14b is wrapped around the entire outer peripheral surface of the electrode bar 5a so as to form a metal-foil sleeve 14a. In this state, the other side part of the metal-foil piece portion 14b on the slit 14c side is wrapped around the electrode bar 5a so as to cover the welding spots We.

As described above, similarly to Embodiment 3, the effect of suppressing the occurrence of microcracks in the sealing portion by the metal-foil sleeve 14a can be improved.

Embodiment 5

An arc tube according to Embodiment 5 of the present invention will be described with reference to FIGS. 9A-9G. The arc tube of the present embodiment is obtained by modifying the configuration of the sealing portion of the arc tube in Embodiment 2, and is configured in the same manner except for the sealing portion. Therefore, the following descriptions will be made using the same reference numerals as those in Embodiment 2 regarding the respective elements identical to those in Embodiment 2. FIGS. 9A-9G show members to be sealed in the sealing portion 3 (see FIG. 6, the same applies to the sealing portion 4) of the arc tube and the assembling process.

Figure 9A:
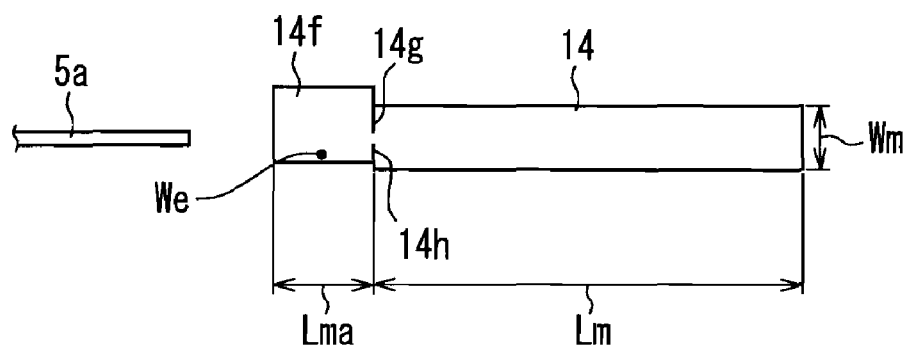
FIG. 9A is a plan view showing members used in a sealing portion of an arc tube in a high-pressure mercury lamp according to Embodiment 5 of the present invention and the assembling process thereof.

First, as shown in FIG. 9A, a metal-foil piece portion 14f is formed at the end of a conductive metal-foil 14. The metal-foil piece portion 14f is shaped differently from the metal-foil piece portion 14b of Embodiment 2. That is, the metal-foil piece portion 14f that is formed in a rectangular shape by slits 14g and 14h is placed at a position slightly shifted upward (in the drawing) from a longitudinal centerline of the conductive metal-foil 14. This means that, with respect to the centerline of the conductive metal-foil 14, an upper side (large-width part) of the metal-foil piece portion 14f is wider than a lower side (small-width part) thereof. The ratio of the width between the large-width part and the small-width part is set so as to obtain a configuration described below. In FIG. 9A, on the small-width part of the metal-foil piece portion 14f, a welding spot We is indicated, which shows a spot to be welded in the following welding procedure.

Figure 9B:
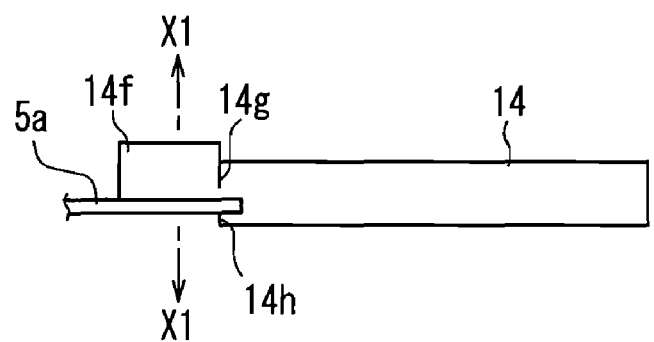
FIG. 9B is a plan view showing a process next to FIG. 9A.
Figure 9C:
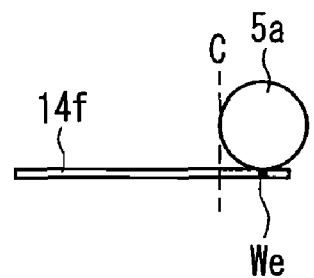
FIG. 9C is an enlarged-lateral cross-sectional view taken along a line X1-X1 in FIG. 9B.

Next, as shown in FIGS. 9B and 9C, an electrode bar 5a is placed along the small-width part side of the metal-foil piece portion 14f so as to overlap with the welding spot We. FIG. 9C is an enlarged cross-sectional view taken along a line X1-X1 in FIG. 9B. In this state, the metal-foil piece portion 14f is bonded to the electrode bar 5a at the welding spot We by resistance welding or the like.

Figure 9D:
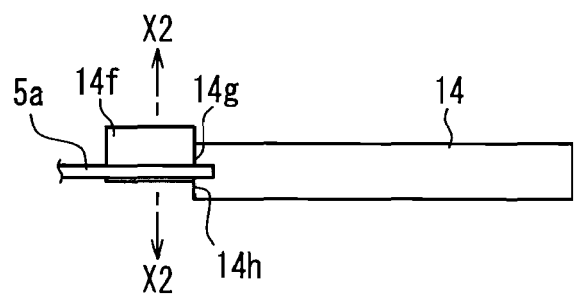
FIG. 9D is a plan view showing a process next to FIG. 9B.
Figure 9E:
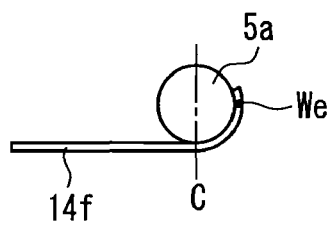
FIG. 9E is an enlarged-lateral cross-sectional view taken along a line X2-X2 in FIG. 9D.

Next, as shown in FIGS. 9D and 9E, the electrode bar 5a is turned to a position along a centerline C of the metal-foil piece portion 14f, while being wrapped with the metal-foil piece portion 14f. FIG. 9E is an enlarged cross-sectional view taken along a line X2-X2 in FIG. 9D.

Figure 9F:
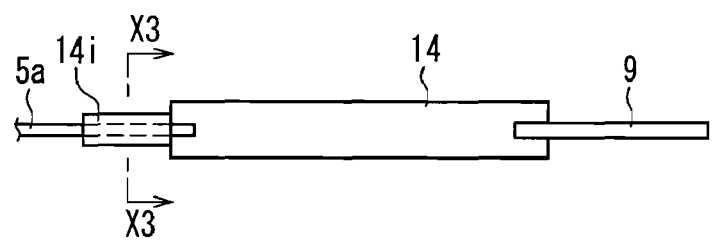
FIG. 9F is a plan view showing a process next to FIG. 9D.
Figure 9G:
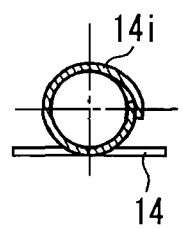
FIG. 9G is an enlarged-lateral cross-sectional view taken along a line X3-X3 in FIG. 9F.

Further, as shown in FIGS. 9F and 9G, the large-width part of the metal-foil piece portion 14f is wrapped around the electrode bar 5a. FIG. 9G is an enlarged cross-sectional view taken along a line X3-X3 in FIG. 9F. Thus, the metal-foil piece portion 14f is wrapped around the entire outer peripheral surface of the electrode bar 5a so as to form a metal-foil sleeve 14i. In this state, the shape and the size of the metal-foil piece portion 14f and the relation of the welding spot We are set so that the large-width part of the metal-foil piece portion 14f covers the welding spot We.

As described above, when the welding spot We of the metal-foil piece portion 14f is covered with another portion of the metal-foil piece portion 14f, the effect of suppressing the occurrence of microcracks in the sealing portion by the metal-foil sleeve 14i can be improved in the same way as in Embodiment 3.

Embodiment 6

An arc tube according to Embodiment 6 of the present invention will be described with reference to FIGS. 10A-10D and FIGS. 11A-11D. The arc tube of the present embodiment is obtained by modifying the configuration of the sealing portion of the arc tube in Embodiment 1, and is configured in the same manner except for the sealing portion. Therefore, the following descriptions will be made using the same reference numerals as those in Embodiment 1 regarding the respective elements identical to those in Embodiment 1. FIGS. 10A-10D and FIGS. 11A-11D show members to be sealed in the sealing portion 3 (the same applies to the sealing portion 4) of the arc tube and the assembling process.

Figure 10A:
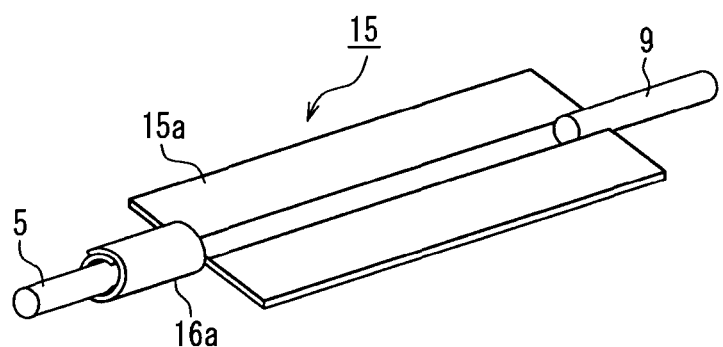
FIG. 10A is a perspective view showing a configuration of a sealing portion of an arc tube in a high-pressure mercury lamp according to Embodiment 6 of the present invention.
Figure 10B:
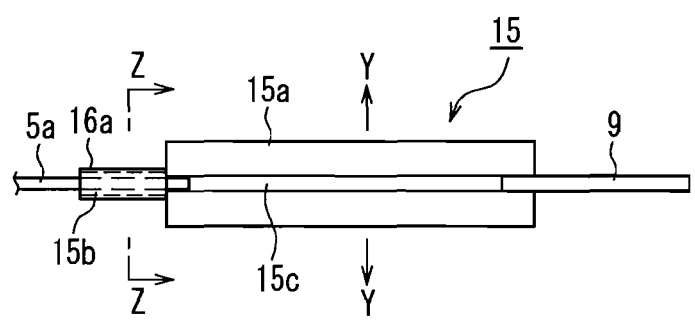
FIG. 10B is a plan view showing a configuration of the sealing portion.

FIG. 10A is a perspective view showing a state of the present embodiment in which an electrode bar 5a, a conductive metal-foil 15, a metal-foil sleeve 16a, and an external Mo lead wire 9 are assembled. FIG. 10B is a plan view thereof. The conductive metal-foil 15 includes a wide part 15a and a narrow foil piece part 15b having a narrower width than that of the wide part 15a (see FIG. 11A). The metal-foil sleeve 16a is an element identical to the metal-foil sleeve 7a of Embodiment 1, and covers the narrow foil piece part 15b.

Figure 10C:
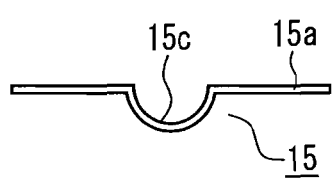
FIG. 10C is an enlarged-lateral cross-sectional view taken along a line Y-Y in FIG. 10B.

FIG. 10C is an enlarged cross-sectional view of the wide part 15a in FIG. 10B taken along a line Y-Y. In the wide part 15a, an arc-shaped groove 15c is formed along the longitudinal centerline. The arc-shaped groove 15c is not only formed on the wide part 15a but also extends to the narrow foil piece part 15b. The entirety of the narrow foil piece part 15b is formed in an arc-shape. The electrode bar 5a and the external Mo lead wire 9 are fitted into the arc-shaped groove 15c in the narrow foil piece part 15b and the wide part 15a, respectively.

Figure 10D:
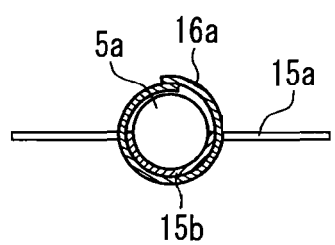
FIG. 10D is an enlarged-lateral cross-sectional view taken along a line Z-Z in FIG. 10B.

FIG. 10D is an enlarged cross-sectional view of the narrow foil piece part 15b in FIG. 10B taken along a line Z-Z. As shown in this figure, the electrode bar 5a is covered tightly with the narrow foil piece part 15b wrapped around a part in a circumferential direction (about halfway around in the figure) of an outer peripheral surface of the electrode bar 5a. Further, the entire outer peripheral surface of the electrode bar 5a and the narrow foil piece part 15b in the region where the narrow foil piece part 15b is wrapped around is covered with the metal-foil sleeve 16a.

Figure 11A:
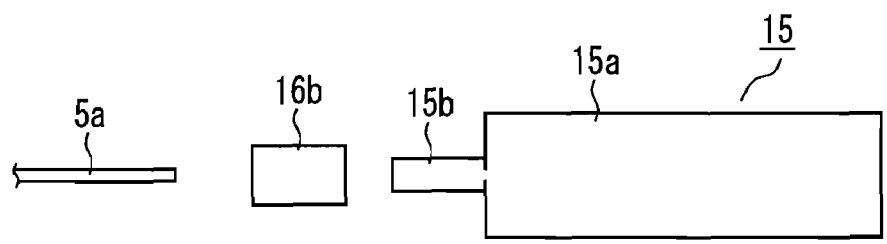
FIG. 11A is a plan view showing members used in the sealing portion shown in FIG. 10A and the assembling process thereof.

A process of manufacturing the sealing portion having the above-described configuration will be described below. However, as to the external Mo lead wire 9, illustrations and descriptions shall be omitted. First, as shown in FIG. 11A, the electrode bar 5a, the conductive metal-foil 15, and the metal-foil piece 16b are prepared. The conductive metal-foil 15 is produced so that the narrow foil piece part 15b is formed at the front end of the wide part 15a. As a matter of convenience, the wide part 15a and the narrow foil piece part 15b will be described using the same reference numerals before and after the processing of the arc-shaped groove 15c.

Figure 11B:
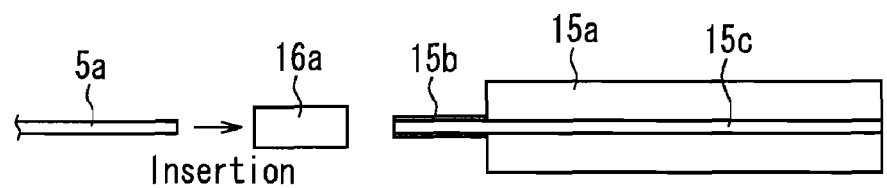
FIG. 11B is a plan view showing a process next to FIG. 11A.
Figure 11C:
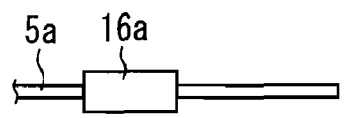
FIG. 11C is a plan view showing a state resulted from the process of FIG. 11B.

Next, as shown in FIG. 11B, in the conductive metal-foil 15, the arc-shaped groove 15c is formed, which extends both to the wide part 15a and the narrow foil piece part 15b. On the other hand, the metal-foil piece 16b is processed into the metal-foil sleeve 16a. Then the electrode bar 5a is inserted into the metal-foil sleeve 16a so as to form a state shown in FIG. 11C. In this state, the front end of the electrode bar 5a should be projected out sufficiently from the metal-foil sleeve 16a.

Figure 11D:
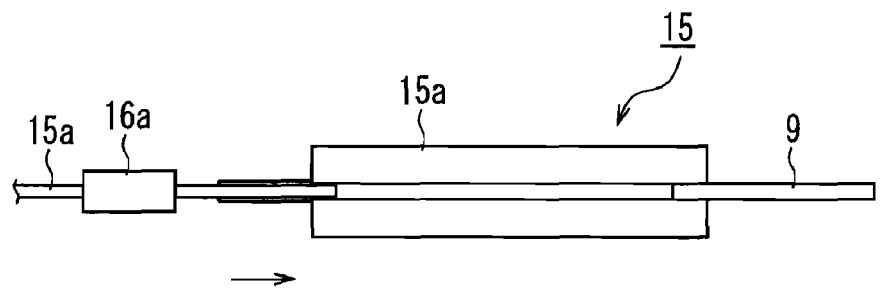
FIG. 11D is a plan view showing a process next to FIG. 11B.

Next, as shown in FIG. 11D, the front end of the electrode bar 5a that is projected out from the metal-foil sleeve 16a is fitted into the arc-shaped groove 15c of the conductive metal-foil 15 so that the front end of the electrode bar 5a extends toward the end of the wide part 15a to some extent beyond the narrow foil piece part 15b. In this state, the narrow foil piece part 15b is welded to the electrode bar 5a. Further, the metal-foil sleeve 16a is moved toward the direction shown by an arrow so as to cover the outer peripheral surfaces of the electrode bar 5a and the narrow foil piece part 15b. Thus, an assembly shown in FIG. 10A is produced.

As described in the present embodiment, when the outer peripheral surfaces of the electrode bar 5a and the narrow foil piece part 15b are covered with the metal-foil sleeve 16a, the occurrence of microcracks in the sealing portion can be suppressed. That is, the cover using the metal-foil sleeve 16a allows itself to function as a buffering member, whereby, in that region, the stress caused by the difference in thermal expansion coefficient can be relieved.

Embodiment 7

Figure 12:
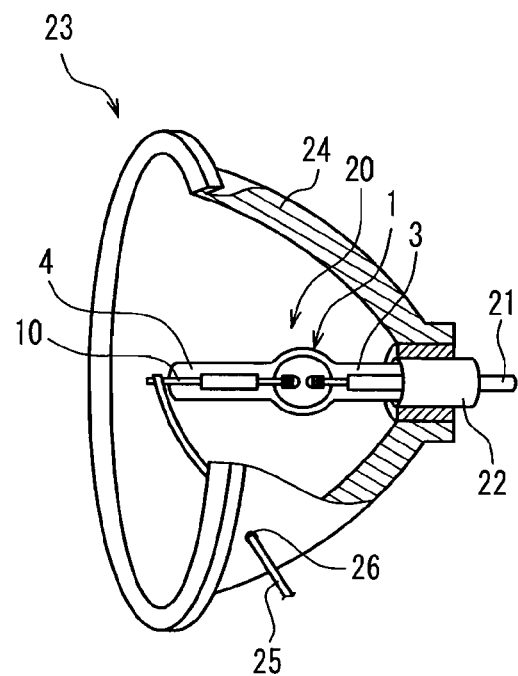
FIG. 12 is a partially cross-sectional perspective view showing a lamp unit according to Embodiment 7 of the present invention.

FIG. 12 shows a lamp unit 23 according to Embodiment 7 of the present invention. This lamp unit 23 is equipped with a high-pressure discharge lamp 20 including an arc tube 1 having a configuration of the above-described embodiments.

The high-pressure discharge lamp 20 is configured in such a manner that a cylindrical metal-cap 22 with a power source-connecting terminal 21 is attached to one sealing portion 3 of the above-described arc tube 1. Here, an external Mo lead wire 9 extended from one sealing portion 3 of the above-described arc tube 1 is connected (not shown) to the power source-connecting terminal 21. The lamp unit 23 has a configuration in which the metal-cap 22 of the high-pressure discharge lamp 20 is attached to and held by a reflection mirror 24. Further, a lead wire 25, which is connected to an external Mo lead wire 10 extended from the other sealing portion 4 in the high-pressure discharge lamp 20, is drawn outside via a through-hole 26 provided in the reflection mirror 24.

As the reflection mirror 24, for example, a spheroidal mirror, a rotational parabolic mirror, or a concave surface (spherical surface) mirror can be used. The mirror surface, for example, is configured in such a manner that a reflecting film made of a multilayer interference film is evaporated on a concave surface portion that is formed on the spheroid of a hard glass base.

Embodiment 8

A projection-type image display device according to Embodiment 8 of the present invention will be described with reference to FIGS. 13 and 14.

Figure 13:
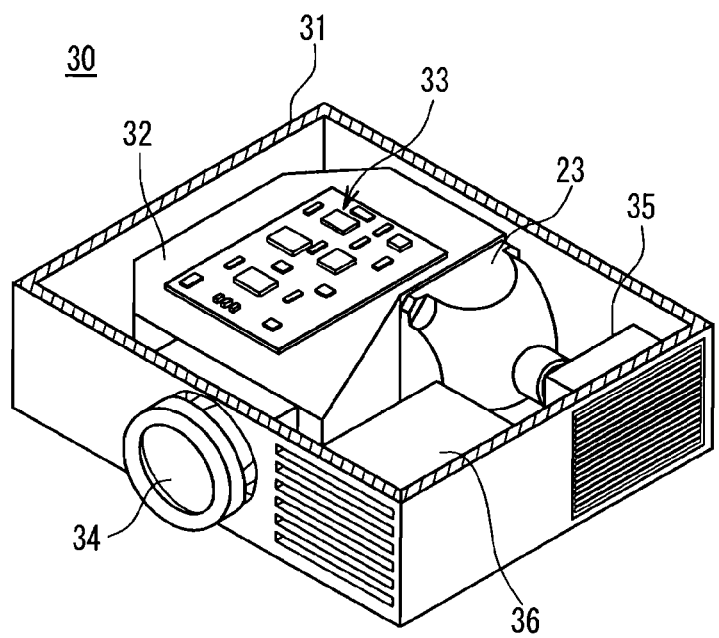
FIG. 13 is a perspective view showing a front projector according to Embodiment 8 of the present invention.

FIG. 13 shows a schematic configuration of a front projector 30 as an example of the projection-type image display device in which the lamp unit 23 according to Embodiment 7 is used. FIG. 13 shows a state where a top of a housing 31 is removed. The front projector 30 is of a type for projecting an image toward a screen (not shown) that is provided on a front side of the projector 30.

The front projector 30 is composed of a lamp unit 23 as a light source, an optical unit 32, a control unit 33, a projection lens 34, a cooling fan unit 35, a power source unit 36 and the like, which are stored in the housing 31.

The optical unit 32 has an image formation unit that modulates incident light so as to form an image, and an illumination unit for irradiating the image formation unit (neither of them is illustrated) with illumination light from the lamp unit 23. The illumination unit has a color wheel or the like (not shown) composed of color filters of three colors, thereby decomposing the illumination light into the three primary colors so as to irradiate the image formation unit with them.

The control unit 33 drives and controls the image formation unit and the like. The projection lens 34 enlarges and projects an optical image that is formed by modulation by the image formation unit. The power source unit 36 converts electric power that is supplied from a commercial power supply into electric power that is suitable for the control unit 33 and the lamp unit 23, and supplies the electric power to the control unit 33 and the lamp unit 23, respectively.

Figure 14:
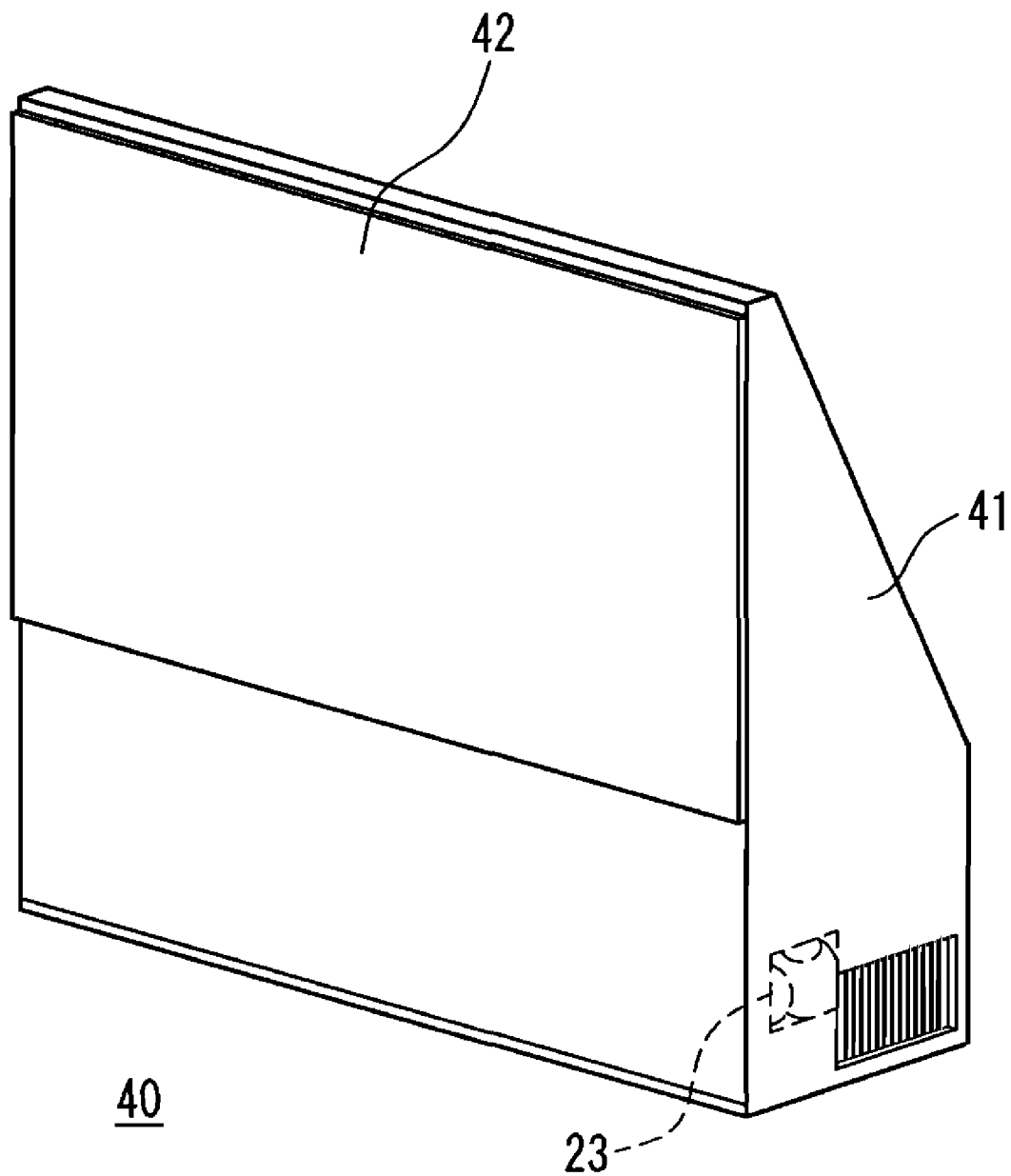
FIG. 14 is a perspective view showing a rear projector according to Embodiment 8 of the present invention.

Moreover, the lamp unit 23 also can be used as a light source of a rear projector 40 that is an example of the projection-type image display device shown in FIG. 14. The rear projector 40 has a configuration in which the lamp unit 23, an optical unit, a projection lens, a mirror (none of them is shown) and the like are stored in a housing 41. The image that is projected from the projection lens and reflected by the mirror is projected from a rear side of a translucent screen 42, whereby the image is displayed.

INDUSTRIAL APPLICABILITY

The high-pressure discharge lamp according to the present invention surely can suppress the occurrence of microcracks in the sealing portion and effectively suppress the fracture in the sealing portion, and therefore, is useful as a high-pressure mercury lamp used as a light source for a projection-type image display device. Further, in addition to the use as the high-pressure mercury lamp, the high-pressure discharge lamp according to the present invention directly can be applied to, for example, a high-pressure discharge lamp such as a metal halide lamp, and therefore, is useful as a metal halide lamp for an automobile headlight and the like.

The invention claimed is:
1. A high-pressure discharge lamp, comprising:
first and second electrodes, each having an electrode bar;
a first external lead wire associated with the first electrode and a second external lead wire associated with the second electrode;
an arc tube made of quartz glass including a light-emitting portion that contains mercury and has the first and second electrodes arranged so as to face each other, and sealing portions connected to both sides of the light-emitting portion; and
conductive metal foils that are sealed in the sealing portions and connect the electrode bars and the respective external lead wire,
wherein one end of the electrode bar is located in an internal space of the light-emitting portion, the other end of the electrode bar is embedded in the sealing portion and bonded at a peripheral surface to the conductive metal-foil, and
at least a part of a portion of the electrode bar embedded in the sealing portion is covered with a metal-foil sleeve, and the metal-foil sleeve is in direct contact with the outer surface of the electrode bar.
2. The high-pressure discharge lamp according to claim 1, wherein a region of the electrode bar covered with the metal- foil sleeve includes at least a portion of the electrode bar that overlaps with the conductive metal-foil.

3. The high-pressure discharge lamp according to claim 1, wherein a metal-foil piece portion is provided at an end of the conductive metal-foil, and the metal-foil piece portion is wrapped around the electrode bar to form the metal-foil sleeve.

4. The high-pressure discharge lamp according to claim 3, wherein the metal-foil piece portion is fixed to the electrode bar at least one spot by welding, and the spot at which the metal-foil piece portion is fixed by the welding is covered with another portion of the metal-foil piece portion.

5. A high-pressure discharge lamp, comprising:

first and second electrodes, each having an electrode bar;

an arc tube made of quartz glass including a light-emitting portion that contains mercury and has the first and second electrodes arranged so as to face each other, and a sealing portion connected to the light-emitting portion; and conductive metal foils that are sealed in the sealing portions;

wherein one end of the electrode bar is located in an internal space of the light-emitting portion, the other end of the electrode bar is embedded in the sealing portion and bonded at a peripheral surface to a conductive metal-foil sealed in the sealing portion, a narrow foil piece part having a width narrower than that of the other portion of the conductive metal-foil is formed at an end of the conductive metal-foil, at least a part of a portion of the electrode bar embedded in the sealing portion is covered with the narrow foil piece part, and the narrow foil piece part, and the electrode bar where the narrow foil piece part is placed, are covered with a metal-foil sleeve, and the metal-foil sleeve is in direct contact with the outer surface of the electrode bar.

6. The high-pressure discharge lamp according to claim 1, wherein the metal-foil sleeve is composed of any one of molybdenum, niobium, rhenium, tungsten and tantalum, or composed of an alloy containing any one of molybdenum, niobium, rhenium, tungsten and tantalum as a main component.

7. A lamp unit comprising:

the high-pressure discharge lamp according to claim 1; and a reflection mirror that has a concave reflecting surface, wherein the high-pressure discharge lamp is attached to the reflection mirror in such a manner that light emitted by the high-pressure discharge lamp is reflected by the reflecting surface.

8. A projection-type image display device comprising:

the lamp unit according to claim 7;

an optical unit that forms an optical image by modulating illumination light from the lamp unit; and a projection device that enlarges and projects the optical image.

* * * * *